A. HERZ.
METHOD OF AND MEANS FOR REGULATING A SYSTEM SUBJECT TO LARGE INTERMITTENT LOADS.
APPLICATION FILED NOV. 26, 1915.
1,385,170.
Patented July 19, 1921.
5 SHEETS—SHEET 4.
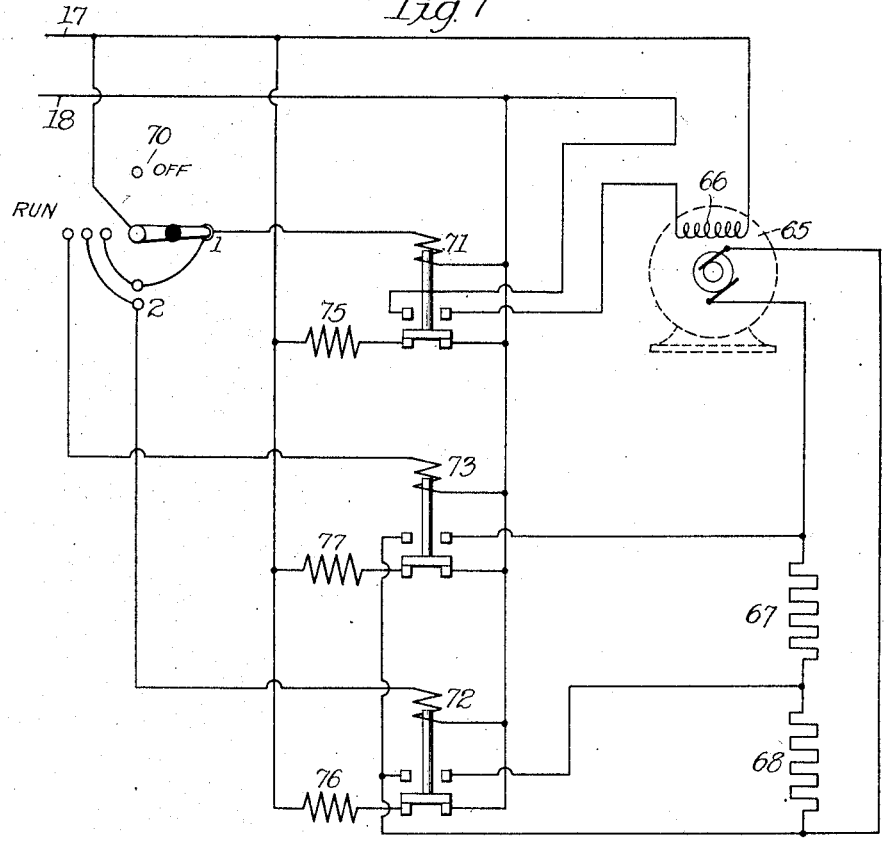
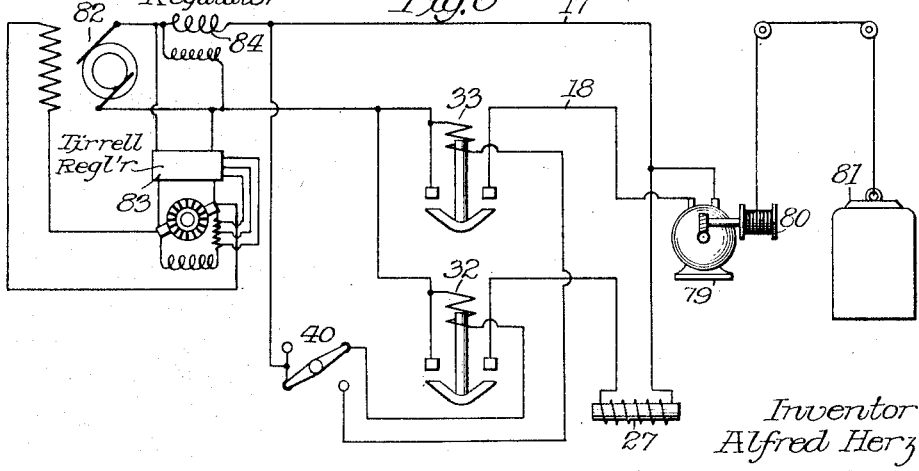
Inventor
Alfred Herz
By Brown, Hanson & Boettcher
Attys A. HERZ.
METHOD OF AND MEANS FOR REGULATING A SYSTEM SUBJECT TO LARGE INTERMITTENT LOADS.
APPLICATION FILED NOV. 26, 1915.
1,385,170.
Patented July 19, 1921.
5 SHEETS—SHEET 5.
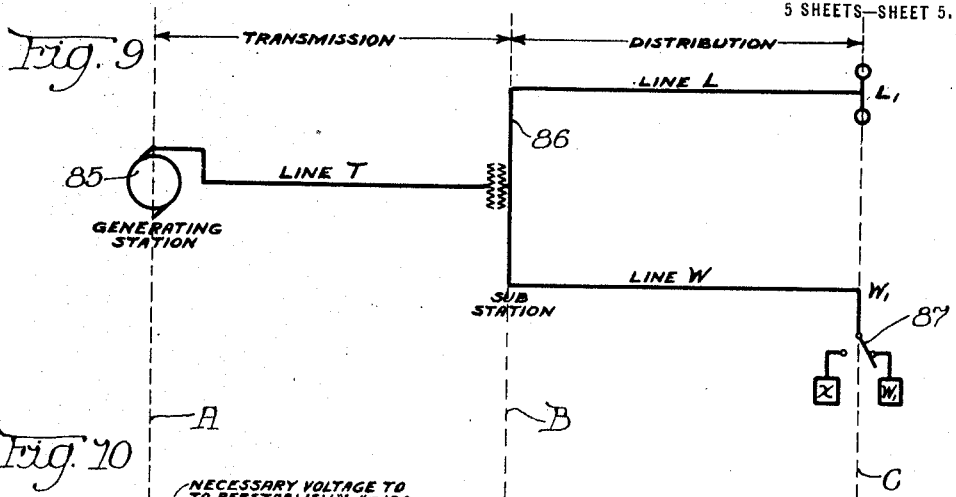
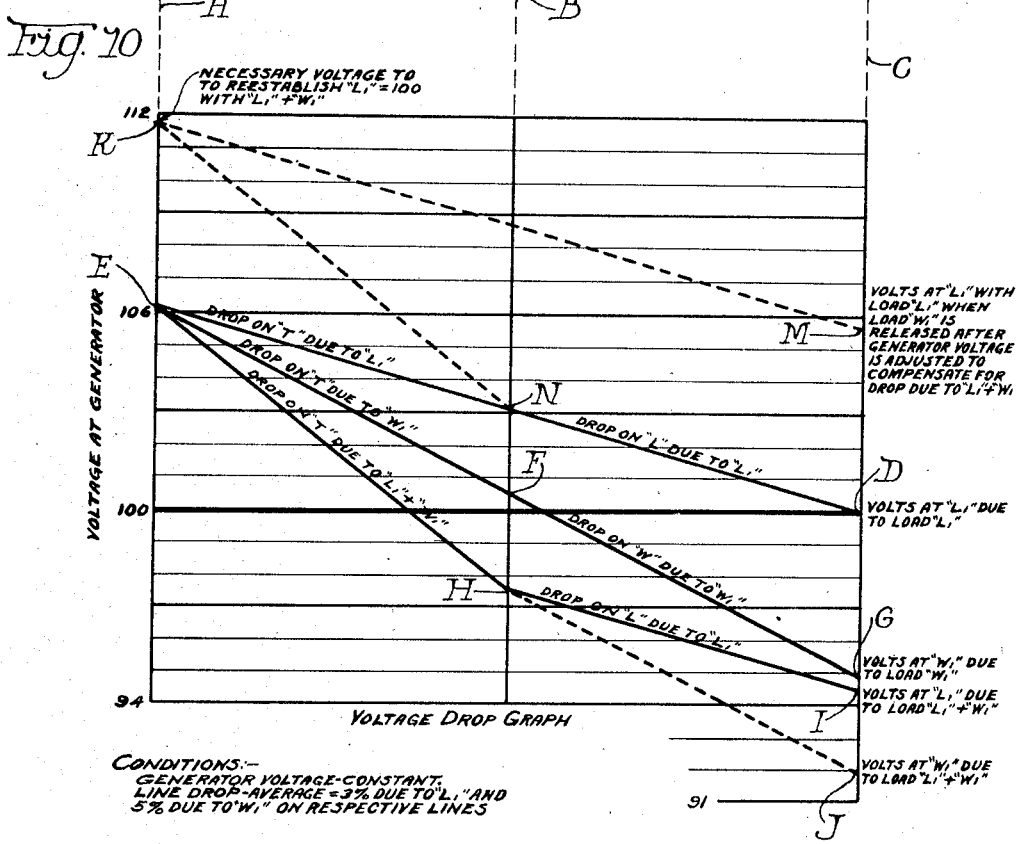

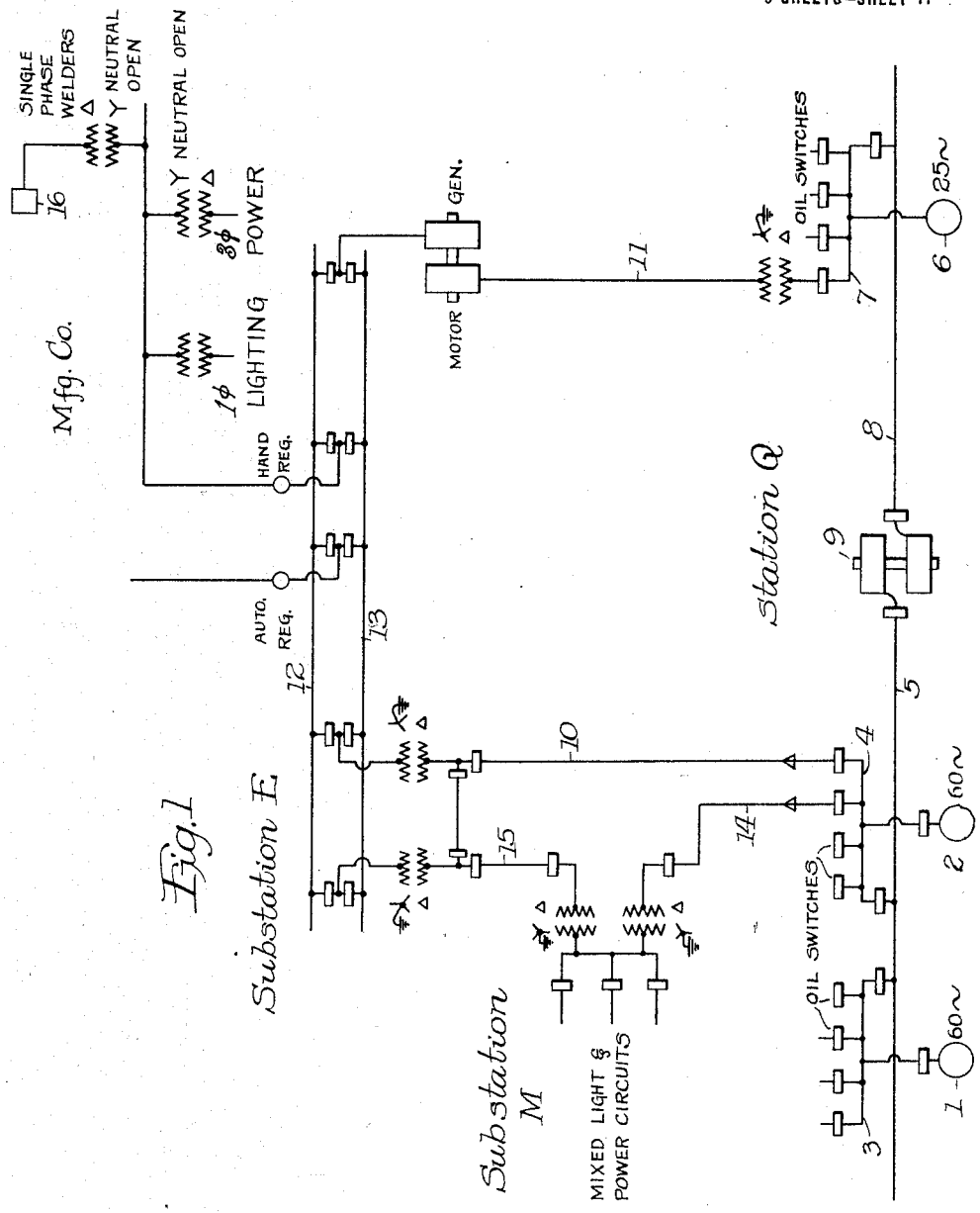

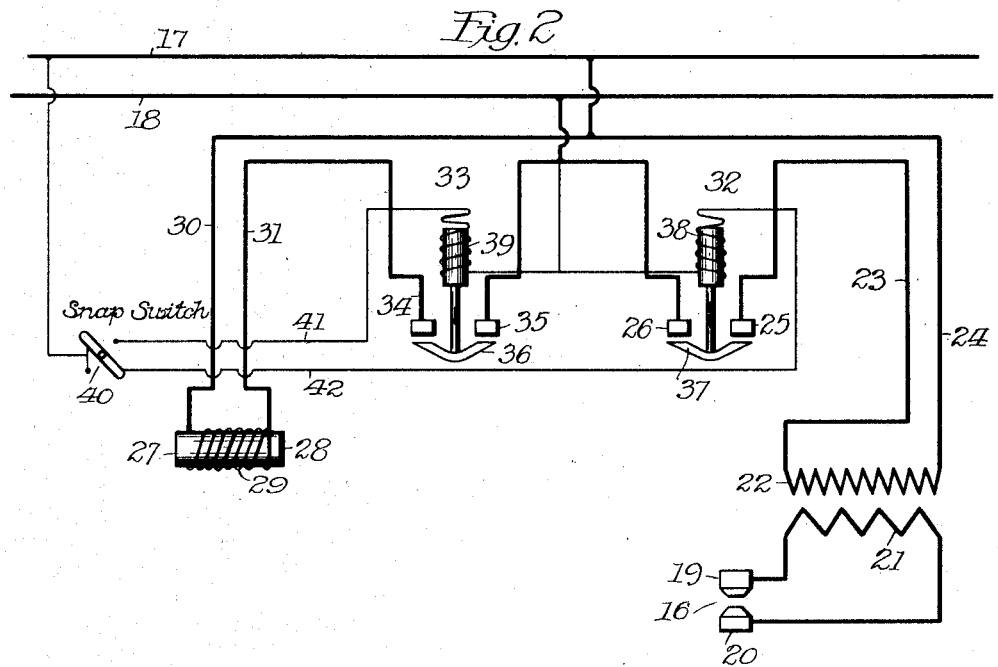
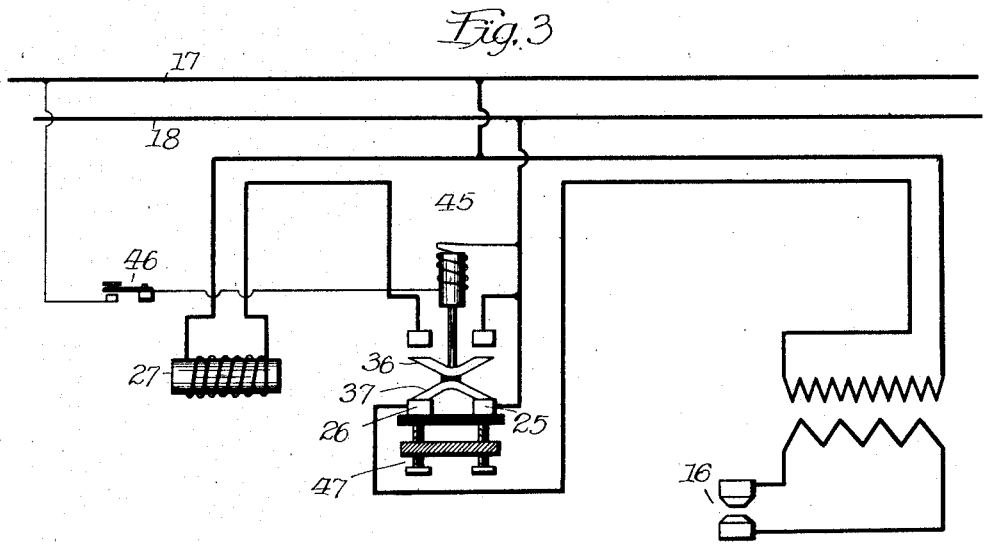

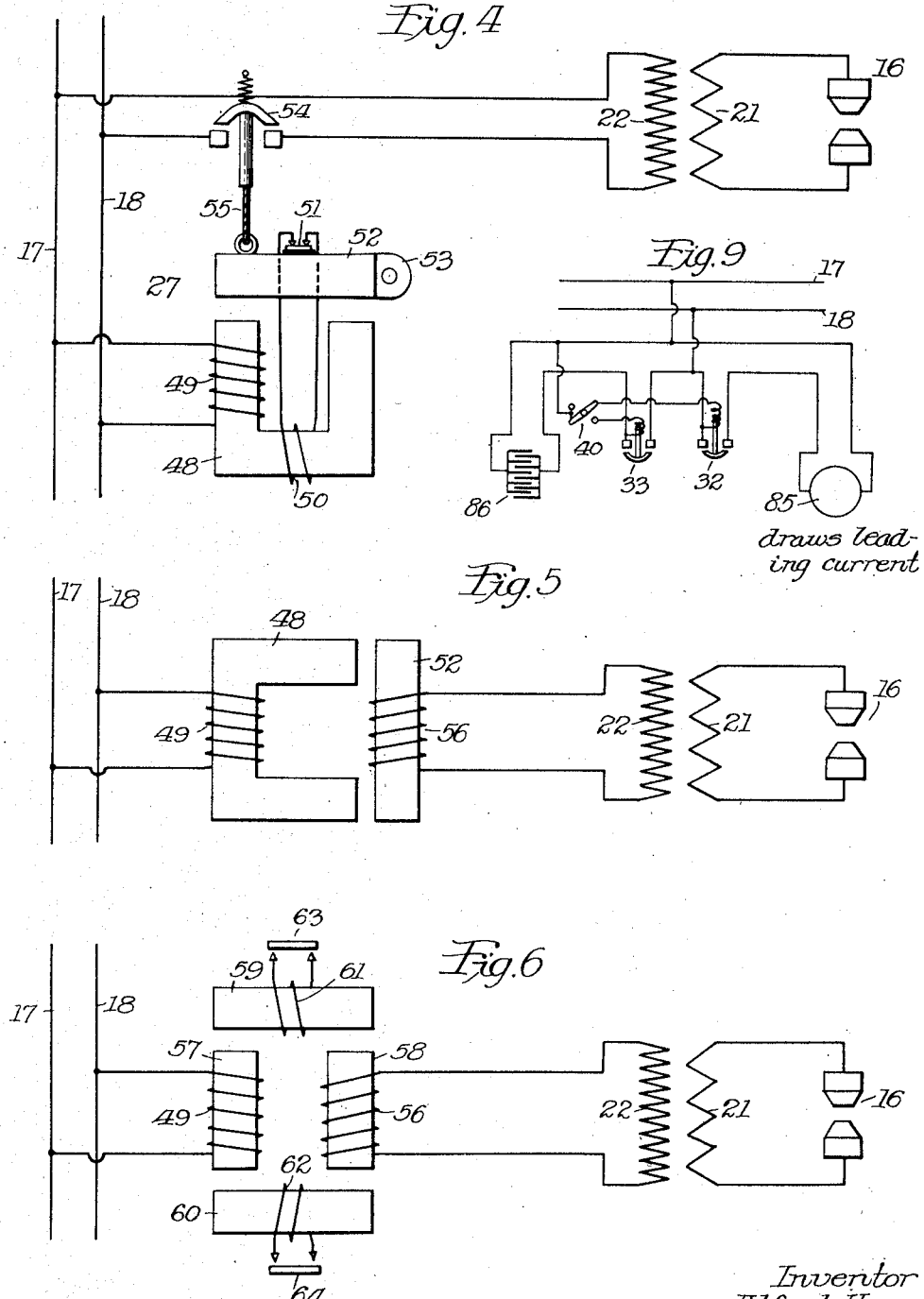

UNITED STATES PATENT OFFICE.

ALFRED HERZ, OF CHICAGO, ILLINOIS.

METHOD OF AND MEANS FOR REGULATING A SYSTEM SUBJECT TO LARGE INTERMITTENT LOADS.

1,385,170. Specification of Letters Patent. Patented July 19, 1921.

Application filed November 26, 1915. Serial No. 63,439.

*To all whom it may concern:*

Be it known that I, ALFRED HERZ, a citizen of the United States, residing at Chicago, in the county of Cook and State of Illinois, have invented a certain new and useful Improvement in Methods of and Means for Regulating a System Subject to Large Intermittent Loads, of which the following is a full, clear, concise, and exact description, reference being had to the accompanying drawings, forming a part of this specification.

My invention relates to a method of and means for regulating a constant potential system of current distribution which is subject to large intermittent loads.

Where a heavy load is thrown on and off of a system of electrical feeders of the above type at irregular intervals, disturbances of a serious character are created. These disturbances make the service less satisfactory and less reliable. The disturbance is usually so sudden that Tirrell regulators placed on the generators or on frequency changing apparatus, or synchronous condensers, or the like, are unable to prevent fluctuation in the voltage of the system. The Tirrell regulator must have a cause to operate, and as soon as the cause exists in this case, the fluctuation has already taken place. This situation arises where large and sudden loads are thrown upon a constant potential distributing system as where electric welding machines are operated, elevator motors are started and stopped, induction furnaces are thrown off and on, and numerous other situations where large drafts of current are suddenly demanded and equally suddenly stopped. Such disturbances are particularly annoying where the apparatus causing them is connected to a large system of distribution which it is desired to maintain at a constant potential, and the disturbance is transmitted in all directions, or where the apparatus is connected at the end of a long transmission line so that the intermittent load tends to create surges and similar disturbances.

The object of my invention is to provide an improved method of and means for reducing or completely neutralizing the disturbances above mentioned.

I have observed that automatic regulating mechanism depending for its action upon a given degree of change to cause it to correct the disturbance, always operates too late. I consider therefore that the only manner in which such disturbances can be corrected is by anticipating and really preventing them.

My present invention is based upon the theory of anticipating the disturbances and applying the corrections at substantially the same time that the cause of the disturbance operates. Or, more specifically stated, my invention contemplates creating a condition of regulating voltage reduction between the times of voltage reduction caused by the application of the intermittent load.

This voltage reduction could be accomplished in a number of ways, but I find it most practical at present to reduce the voltage between periods of loading by a source of voltage having a component opposite in phase to the line voltage sufficient to hold down the voltage to a degree comparable with the amount it is pulled down by the load.

Inasmuch as the voltage reduction, caused by the load, is due to a flow of current, I propose to employ a flow of current for producing the regulating voltage. I provide an inductance or other means of drawing an out-of-phase current, and connect this means to the distributing mains when the load is disconnected and disconnect this means from the mains when the load is connected. In case the load is inductive, the current that is drawn is lagging in character and it tends to demagnetize the field of the generator producing the voltage.

In a similar manner, if the normal load draw a leading current, or if the character of the system is such as to furnish a leading current, instead of employing an inductance, I may employ a piece of apparatus drawing current of a leading characteristic, as a condenser or the like.

Thus, not only does the inductance tend to take the place of the load itself so far as the regulating effect upon the system is concerned, but it is possible, by employing this scheme of substitution, to flatten out the disturbance to such an extent that the Tirrell regulator on the generator can operate to hold the voltage substantially constant. That is to say, the substitution exerts a smoothing out effect and thus allows the automatic regulating apparatus to assume the burden of regulation instead of depending solely upon the substitution.

In the accompanying drawings, which form a part of the present specification, I have illustrated a number of ways in which the principles of my invention may be employed and utilized.

Figure 1 is a diagram showing in outline one type of distributing system upon which I have employed my invention;

Fig. 2 illustrates diagrammatically the application of my invention to feeder mains for a welding machine;

Fig. 3 illustrates a modified form of switching arrangement for the same;

Figs. 4, 5 and 6 illustrate different schemes of substituting and regulating device for the load;

Fig. 7 illustrates the invention applied to a motor starting system;

Fig. 8 illustrates the application of my invention to an elevator motor;

Fig. 9 illustrates the invention as applied to correcting the regulation of a line which feeds a piece of apparatus drawing current of a leading characteristic; and Fig. 10 is a voltage diagram of the circuit shown in Fig. 9.

I shall first describe, very generally, the nature of the problem which my invention is designed to solve with the aid of the diagram of Fig. 1. This diagram is wholly schematic and is not intended to represent the actual connections, but to illustrate only the nature of the distributing system.

The generators 1 and 2 are connected by oil switches to the generator buses 3 and 4, respectively, and these generator buses in turn may be tied together through suitable oil switches to the equalizing bus 5. The generator 6 which generates current at a frequency of 25 cycles, is connected to its bus 7 and this in turn may be connected by suitable oil switches to the 25 cycle bus 8. The equalizing buses 5 and 8 may be tied together through the frequency changer 9, so that current of the proper frequency may be fed out for each type of feeder circuit, even if only one of the generators be in operation. It is assumed that the generators 1, 2 and 6 are all situated in one station. From the main generating station Q a number of feeders, two of which I have indicated by the feeders 10 and 11, supply current to the substation E where suitable oil switches are provided for connecting either one of these feeders to either one of the buses 12 and 13. A suitable feeder cable 14 connects the generating station Q with another substation M as shown at the left of the figure. The substations M and E are tied together by a cable 15 so that power may be fed to the substation M either directly from the generating station or around through the substation E and the same manner of feeding the substation E may be adopted. At the upper right hand corner of the figure is located the power bank of the manufacturing company employing a number of welding machines. These welding machines are operated as single phase pieces of apparatus although the distributing system is a three phase system. The power circuits for the manufacturing company are three phase but the lighting circuits are single phase. It will be understood that the usual regulating mechanism is applied to this system as is well known in the present state of the art. In a system of which this diagram represents a small part, the distance between the main generating station and the substation E is such as to employ a cable of a length of about 15 miles. The feeder extending from the substation E to the manufacturing company power board is 2 or 3 miles. In addition there are circuits extending on all sides of the station Q at greater and less distances.

The operation of the welding machine at the manufacturing company plant destroys the regulation of the entire system by the sudden change in voltage condition.

The welding machine 16 is fed from a single phase of a delta connected transformer winding over the wires 17 and 18, shown in Fig. 2.

The welder 16 comprises a pair of welding electrodes 19 and 20 and a transformer winding 21 for generating a low voltage current of great magnitude. The secondary winding 22 is connected back by means of the wires 23 and 24 to the feeder wires 17 and 18. The wire 23 is connected to a stationary terminal 25 of an electrically operated switch, the other stationary contact of which, 26, is connected to the feeder wire 18.

The inductance 27 which comprises the core 28 and the winding 29, is connected by means of the wires 30 and 31 to the same feeder mains 17 and 18 through the electrically operated switch 33. This switch comprises a pair of stationary contacts 34 and 35, and a movable switch member or contactor 36 adapted to close the circuit through the stationary contacts 34 and 35. The contactor 37 of the switch 32 is controlled by the core 38 and the contactor of the switch 33 is controlled by the core 39 in a similar manner. A snap switch 40 has two positions corresponding to the wires 41 and 42 running to the electrically operated switches 33 and 32 respectively. When the system is energized and the snap switch 40 stands in the position illustrated in Fig. 2, the switch 32 will be closed, thereby connecting the electrical welder 16 to the main. The leakage of the welding transformers 21 and 22 is large so that the current drawn by the welders includes a considerable component of lagging current, that is to say, the welder operates on a power factor considerably less than unity.

When it is desired to disconnect the welder 16, the snap switch 40 is operated to open the switch 32 and close the switch 33. The inductance coil 27 is thus substituted for the load of the welder 16, but it is to be noted that the power factor of the coil 27 is far below that of the welder 16. The lagging current that is drawn by the inductance coil 27 pulls down the voltage of the line, or rather holds it down to substantially the same degree as the welder 16. This does not mean that the current drawn, that is the power consuming current, is of the same magnitude as that drawn by the welder 16—in fact, it may be as low as one-tenth, or less. Incandescent lamps of a predetermined standard voltage are connected in multiple across the mains and may be connected and disconnected at will as the voltage is maintained at the proper value for their operation.

The effect upon the regulation is salutary—no disturbance upon the rest of the circuit is caused. The full line voltage is available for the load, even though the same is connected and disconnected intermittently.

In Fig. 9 I have indicated in simplified form the relations of the different parts of the system and their essential relations to each other. The generator 85 is located at the generating station and is connected by a transmission line T to the substation indicated in the figure. At this point the line T is connected to the substation bus 86 and from this point the current is distributed to the various consumers. The line L runs from the sub-station to the lamp load L'. The lamp load L' consists of a residence lamp load, the brilliancy of which lamps it is desired to maintain substantially uniform and constant. The sub-station is also connected by the line W to the welder W'. A suitable switch 87 is provided as indicated to switch the inductance load X upon the line W when the welder W' is disconnected.

Fig. 10 is laid out to correspond with Fig. 9, the line A serving as an ordinate indicating the voltage at the generating station. The line B serves as an ordinate indicating the voltage at the sub-station on the bus 86 and the line C serves as an ordinate for indicating the voltage at the lamp L' and at the welder W' or in other words at the terminals of the lines L and W. The horizontal distance between the lines A, B and C represent roughly the distance between these various pieces of apparatus in order to indicate graphically the voltage conditions throughout the system.

Assume that it is desired to maintain 100% voltage or roughly we will term it 100 volts at the lamp L'. We take the point D on the line C and plot the voltage drop on the line L due to the flow of current for the lamp L'. Assuming at this time that the welder W' is not operating, we continue the line to indicate the drop of voltage on the transmission line T and arrive at the point E which is in the neighborhood of 106 volts required at the generator to maintain the proper voltage at the lamp L'. Assume therefore that we adjust the generator for 106 volts terminal voltage and disconnect the lamp L' and connect the welder W' to find out what the independent aspect of the welder W' will be. Beginning with the point E and plotting the voltage along the line T and then along the line W we find that the voltage drops on the line T according to the graph E—F and continuing the voltage graph on the line W we find that the voltage drops as indicated by graph F—G finally arriving at the value of about 95 volts, due to the welder alone.

It can now be seen that if the proper generator voltage is maintained for the lamp L' this voltage would not be proper if the welder W' were connected. If now the lamps are connected to the generator and the welder be then also connected in parallel the voltage graph on the line T can be plotted as the graph E—H. Beginning with the voltage indicated by the point H at the sub-station the voltage drop on the distribution line L to the lamp L' will follow the graph H—I. The graph of voltage on the distribution line W would then become the dotted line H—J. It can now be seen that if the welder is switched off the voltage on the lamp L' will rise to the point D and when the welder is switched on again the lamp voltage will drop to the point I. The switching off and on of the welder causes a variation in the lamp voltage of about roughly 6% in the voltage as plotted in Fig. 10.

By employing the inductance X and switching in the same when the welder W' is disconnected I am able to evolve a stable system of transmission and distribution. By raising the generator voltage to the point "K" the correct voltage for the lamps can be maintained. Hence the final graph of the system is as follows: The voltage graph on transmission line T follows the line K—N and from the point N which corresponds to the bus 86 at the sub-station the voltage curve for the line L follows the graph N—D.

The voltage curve of the line W has not been plotted but it would begin at the point N and run parallel to the graph H—J.

If the generator voltage had been determined at the point K in order to bring the lamp voltage to the right value at the point D and the welder were then disconnected without thereafter connecting the inductance X the voltage upon the lamp would rise along the graph K—M. This chart is for the purpose of illustration only and is not intended to set out any specific determined values.

Fluctuation of voltage on the lamp L' is of primary importance and must be avoided.

My method of avoiding fluctuations on the lamps inherently maintains a consistently nonfluctuating voltage on the welder circuit so that lamps of suitable voltage may be connected on the line W.

In Fig. 3 I have shown a single switch 45 for performing the switching function. The contactors 36 and 37 control the circuits of the inductance coil 27 and of the welder 16, respectively. A single switch or key 46 controls the circuit of the electromagnetic switch 45. The position of the stationary contacts 25 and 26 may be controlled by a suitable adjusting mechanism 47 so as to control the extent of movement of the contactors 36 and 37. It is to be understood that these contactors may be connected to suitable dashpot mechanism for securing the proper speed of operation to suit the particular condition.

In Fig. 4 the inductance coil 27 is constantly connected to the mains 17 and 18, but the effective value of the same is changed when the welder 16 is operated. The inductance 27 comprises a U-shaped core 48, upon one leg of which is the winding 49. A short circuiting coil 50 is connected upon the bottom leg and this coil is normally closed through a set of contacts 51, mounted upon the movable magnetic section 52. This magnetic section 52 is pivoted at 53 or may be otherwise movable into engagement with the legs of the core 48. A switch 54, for closing the circuit of the welder 16, is connected by means of the links 55 to the movable core section 52.

It can be seen that when the switch 54 is open, that is, when the welder is not in operation, the inductance 27 will draw a maximum of current. The leakage will also be a maximum. When the core is in the position shown in Fig. 4 with the winding 50 short-circuited, the lines of force will be choked out of the iron core, and the maximum of leakage effect will be produced. When the switch 54 is closed, by moving the movable core section 52 against the legs of the core 48, the welder 16 draws current and due to the closed magnetic circuit of the core 48 and the section 52, a very small current, amounting merely to the exciting current, will be drawn by the winding 49.

In Fig. 5 I have shown the manner in which the switching from one type of load to another may be done in the magnetic circuit by placing a winding 56 upon the movable section 52. When the movable section 52 rests upon the legs of the core 48, the device operates as a transformer and the welder 16 draws the proper amount of working current. When the core is withdrawn mechanically, the leakage is so greatly increased that the winding 49 draws a very large lagging current functioning as an inductance. The transition from an inductance to a transformer or vice versa can be made very smooth so that practically no disturbance upon the line is created.

Fig. 6 illustrates another way in which the magnetic switching may be carried out. In this case the iron core is made up of a plurality of sections 57, 58, 59 and 60. The portions 59 and 60 are movable to close the magnetic circuit so that the two windings 49 and 56 are placed in close inductive relation to form a transformer. When these movable sections are moved outwardly, the air-gap that is created thereby, causes such leakage that the winding 49 draws largely a lagging non-power consuming current. In addition the cores 59 and 60 are provided with windings 61 and 62 respectively, with suitable contact mechanism 63 and 64 for short circuiting these coils when in the outer position to choke out magnetism therefrom.

In Fig. 7 I have illustrated my invention as applied to compensating for the line and load drop caused by the connection of the induction motor, 65. This motor has a stator winding 66 and a suitable rotor winding, not shown, the rotor winding being led to a pair of slip rings for the inclusion of suitable resistances 67 and 68, in the circuit of the rotor winding, as is well understood in the art. A suitable controller 70 controlling a set of electromagnetic switches 71, 72 and 73 serves to connect the motor to the mains and to cut out the different steps of resistance simultaneously switching the inductances 75, 76 and 77 in, in suitable steps to compensate for the effect of switching various parts of the motor. The controller has four positions, namely, an off position, two starting positions, and a running position. Upon the first step the switch 71 is operated to connect the stator winding 66 to the main and to disconnect the inductance 75. On the second starting step, the switch 71 is held in the operative position and the switch 72 is then operated to short circuit one of the sections of resistance 68 and at the same time disconnect the inductance 76 from the line circuit. In the running position, the switches 71 and 72 are held in their actuated position and the switch 73 is operated to cut out the last step of resistance and to disconnect the last inductance 77. The motor may be disconnected by simultaneously disconnecting the switches 71, 72 and 73, or by turning the controller back and gradually cutting out the various steps of the load and cutting in the corresponding steps of inductance.

In Fig. 8 I have illustrated the manner in which my invention may be applied to a hoisting or elevating motor, the motor 79 which is connected to a hoist 80 for operating an elevator cage 81, is adapted to be connected directly to the mains 17 and 18, for raising and lowering the elevator. The control circuit is identical with that shown in Fig. 2. I have shown in this figure the generator 82 as controlled by a suitable Tirrell regulator for holding the generated voltage at a given value and have shown also an induction regulator for maintaining automatically a substantially constant voltage upon the line.

The Tirrell regulator and the induction regulator, while of the utmost sensitivity, are utterly incapable of keeping up with the swift change of current incident to connecting a motor directly upon the line. This can be done only by means which will anticipate the change and will apply the correction at the same time that the disturbing action takes place.

In Fig. 9 I have illustrated a load 85 which draws current of a leading characteristic. To compensate for such fluctuations as would be caused by connecting this load directly to the line, I employ a condenser 86 which draws current of a non-power consuming characteristic which tends to hold voltage on the lines 17, 18 substantially constant.

It will be apparent at once to those skilled in the art, that this method of regulation is applicable to a variety of situations, differing greatly. But I consider that the above description and drawings fairly illustrate typical situations in which my invention becomes highly useful. I therefore consider that the appended claims are entitled to a very wide range of equivalents and intend that the same be construed accordingly.

What I claim is:

1. In combination a prime generator of alternating current, a constant voltage transmission line operatively linked to said generator, a current distributing system having a distribution main operatively linked to said transmission line, means to regulate said generator to impress a substantially constant voltage upon said transmission line, said voltage being higher than a predetermined standard voltage, a load device requiring large intermittent drafts of power current connected to said distributing main, said load device being adapted to cause sufficient drop in voltage on the distributing main to bring the voltage upon the same to substantially said predetermined standard voltage, an inductive loading device drawing less power current than said first mentioned load device, switch means for disconnecting said load device and for simultaneously connecting said inductive loading device, said inductive device being adapted to hold down the voltage upon said distributing mains to substantially the predetermined standard voltage, and a plurality of predetermined standard voltage incandescent lights adapted to be connected in varying numbers at will in multiple to said distributing mains, the draft of power current required by the first mentioned load device being considerable in comparison with the power consumed by said lamps.

2. In combination a generator, means for holding the voltage of the generator constant over a wide range of load, distributing mains, fed by said generator, a constant voltage lamp load of variable amount connected to said mains, a welding machine having a welding transformer adapted to be connected to said mains, said welding machine making drafts of power current considerable in comparison with the current consumed by the lamp circuit, an inductance of a capacity sufficient to lower the voltage of the mains substantially the same amount as the welding machine, said inductance consuming less power than the welder, and means for substituting the inductance for the welding machine, said means being operable so rapidly that no detrimental change of voltage appears upon the distributing mains.

3. In combination, distributing mains, constant voltage lamp load connected to said mains, means for maintaining a constant voltage on said mains, said voltage being higher than the voltage of said lamp load, a load device, requiring drafts of power current considerable in comparison with the power consumed by said lamps, a current consuming device drawing less power current than said first load device and switching means for connecting said load device and said current consuming device to said mains alternately only, said devices each reducing the impressed voltage to the standard voltage of the lamp load.

4. In combination, a line, a lamp circuit connected to the line, a load circuit also connected to the line, a load device adapted to be intermittently connected to the load circuit, said load device being of such character as to draw a relatively large current at relatively high power factor whereby a voltage drop largely of I R character is caused in the line such as to disturb the illumination of the lamps and an inductive load adapted to be substituted for the load device and vice versa, said inductive load device being of such a character as to draw current at a relatively low power factor and to cause a voltage drop largely of I X character of substantially the same effect on the lamp circuit as the drop caused by said load device and means for substituting said inductive load device for said load device and vice versa.

In witness whereof I hereunto subscribe my name this 24th day of November, A. D. 1915.

ALFRED HERZ.

It is hereby certified that in Letters Patent No. 1,385,170, granted July 19, 1921, upon the application of Alfred Herz, of Chicago, Illinois, for an improvement in "Methods of and Means for Regulating a System Subject to Large Intermittent Loads," an error appears in the printed specification requiring correction as follows: Page 2, line 32, after the word "characteristic" insert the words *Fig. 9 is a simplified circuit diagram;* and that the said Letters Patent should be read with this correction therein that the same may conform to the record of the case in the Patent Office.

Signed and sealed this 15th day of November, A. D., 1921.

[SEAL.]

KARL FENNING,

*Acting Commissioner of Patents.*